(12) United States Patent
Glogan et al.

(10) Patent No.: US 6,493,033 B1
(45) Date of Patent: Dec. 10, 2002

(54) ELECTRONIC APPARATUS ADAPTED TO RECEIVE A MEMORY CARD

(75) Inventors: David J. Glogan, Rochester, NY (US); Glenn W. Johnson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/208,072

(22) Filed: Dec. 9, 1998

(51) Int. Cl.[7] .............................. H04N 5/76; H04N 5/225
(52) U.S. Cl. ..................... 348/375; 348/231.7; 348/376; 358/906; 360/99.06; 361/737; 386/118
(58) Field of Search ............................... 358/906, 909.1; 348/207, 231, 233, 373, 374, 375, 376, 231.99, 231.7, 231.8; 386/117, 118; 361/684, 737; 439/326, 910; 360/90, 93, 99.06; H04N 5/225, 5/76

(56) References Cited

U.S. PATENT DOCUMENTS

| | | | |
|---|---|---|---|
| 4,853,806 A | 8/1989 | Tamada | 360/99.06 |
| 4,943,867 A | 7/1990 | Suetaka et al. | 386/118 |
| 4,986,618 A | 1/1991 | Wakatsuki | 312/276 |
| 5,016,107 A | 5/1991 | Sasson et al. | 348/231 |
| 5,034,824 A | 7/1991 | Morisawa et al. | 386/118 |
| 5,258,878 A | 11/1993 | Araki et al. | 360/60 |
| 5,337,220 A | 8/1994 | Granitz | 361/816 |
| 5,657,081 A * | 8/1997 | Kurahashi | 348/233 |
| 5,757,622 A * | 5/1998 | Tanaka | 361/737 |
| 5,781,232 A * | 7/1998 | Ejima | 348/233 |
| 5,961,338 A * | 10/1999 | Wu | 439/326 |
| 5,980,294 A * | 11/1999 | Kanda | 439/326 |
| 6,227,893 B1 * | 5/2001 | Kancho | 439/326 |

* cited by examiner

Primary Examiner—Ngoc-Yen Vu
(74) Attorney, Agent, or Firm—Susan L. Parulski

(57) ABSTRACT

An electronic apparatus for receiving a memory card. A card connector is disposed in an opening of an exterior wall of the electronic apparatus. A door connected to the electronic apparatus pivots between and open and closed position. In the open position, a slot integral with the door removably receives the memory card. In the closed position, an exterior surface of the door covers the opening. An aperture in the slot is arranged in overlapping registration with the electrical connection portion when the door is in the closed position whereby, when a memory card is disposed within the slot, a terminal portion of the memory card forms an electrical connection with the electrical connection portion.

8 Claims, 9 Drawing Sheets

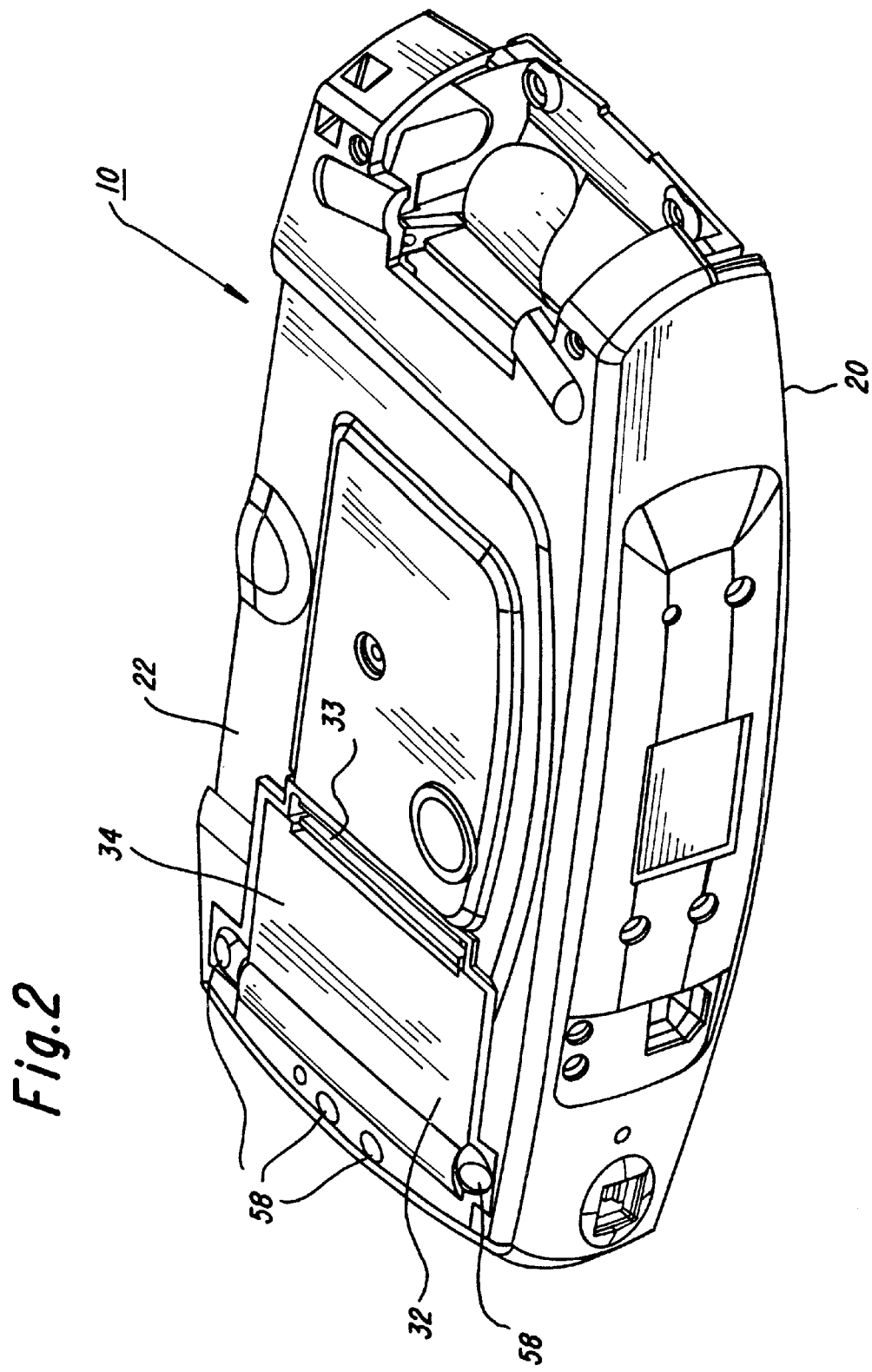

Fig.5

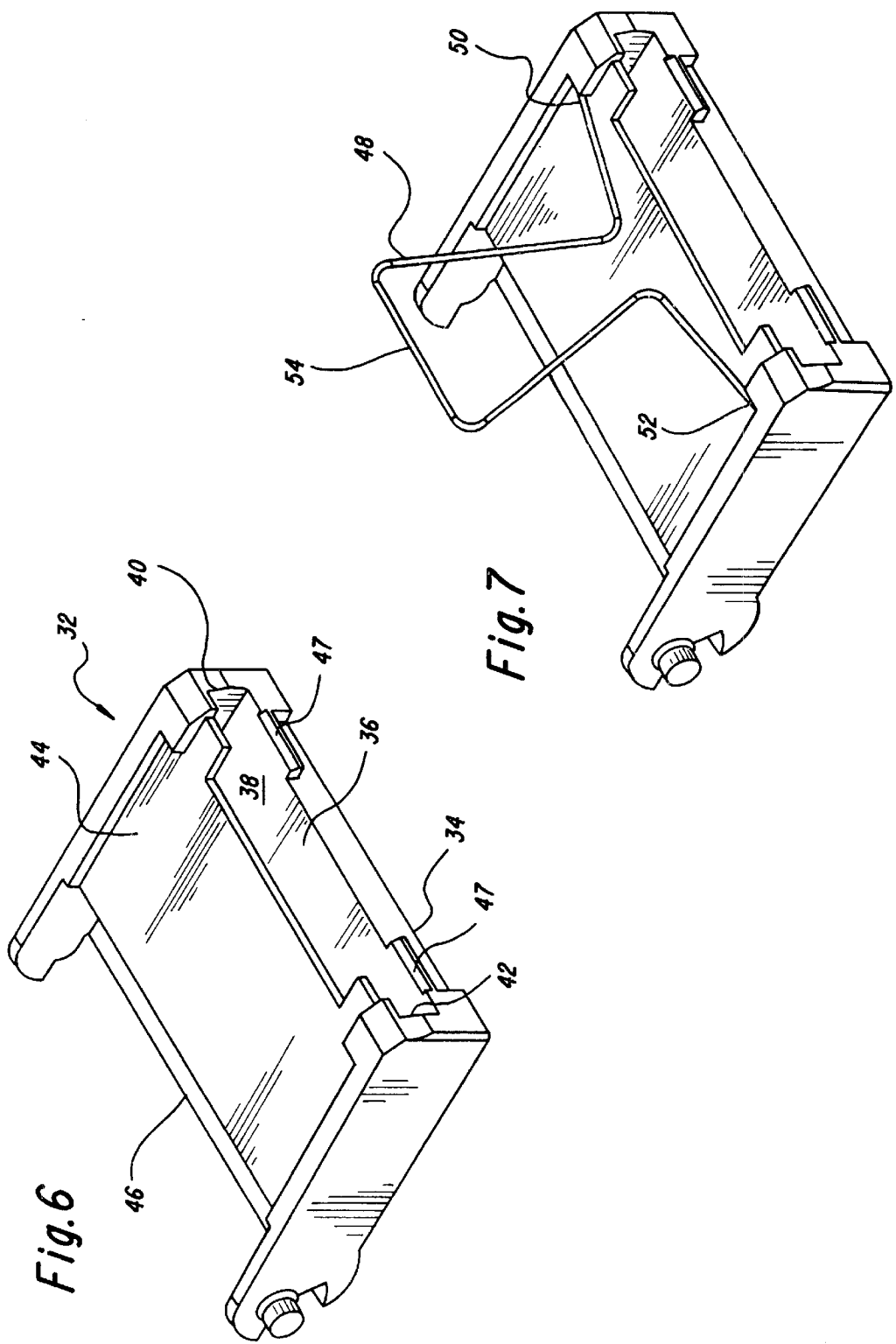

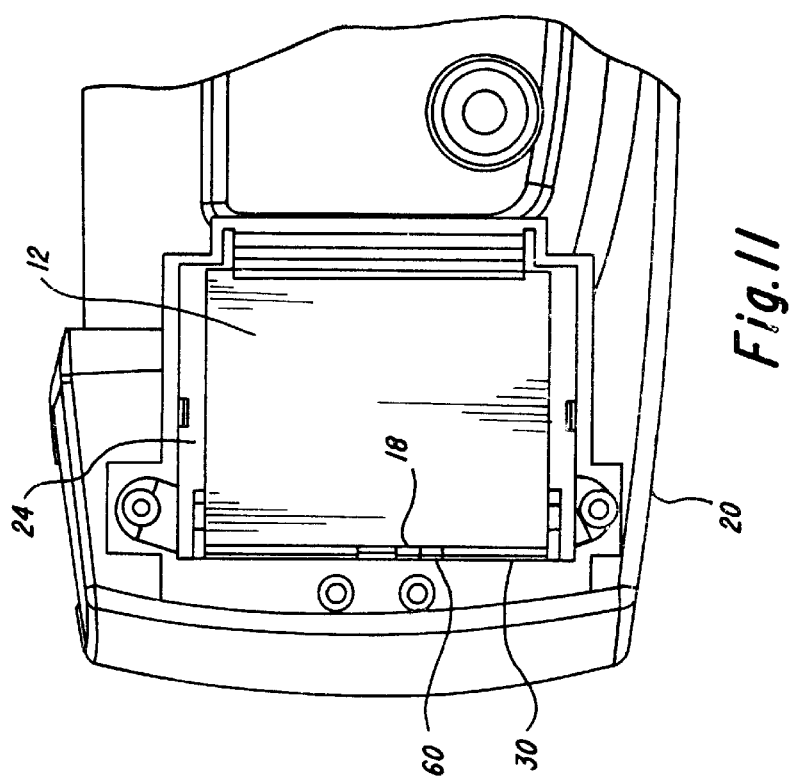
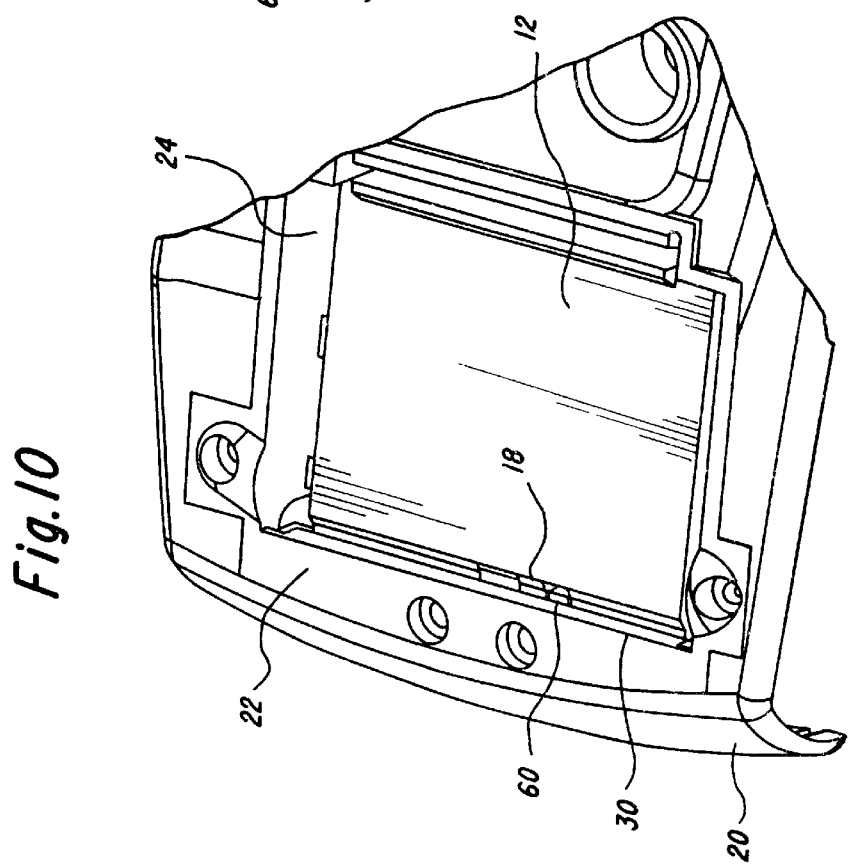

ELECTRONIC APPARATUS ADAPTED TO RECEIVE A MEMORY CARD

FIELD OF THE INVENTION

The present invention relates generally to a memory card receiving apparatus, such as an electronic camera. More particularly, the present invention relates to an improved design for receiving the memory card and forming an electrical connection therewith.

BACKGROUND OF THE INVENTION

A digital imaging device is a device which uses an electronic sensor to capture an image either directly from an object or indirectly from a medium such as film; signal processing to represent the captured signal numerically; and some storage device to preserve the numerical image data. Known imaging devices (e.g., electronic camera, film scanner, or data collector) use a removable storage device, such as an integrated circuit memory card, to store images. For example, U.S. Pat. No. 5,016,107 (Sasson et al), commonly assigned, describes an electronic still camera utilizing image compression and providing digital storage in a removable memory card having a static random access memory. In this electronic camera, the integrated circuits in the removable memory card store image data and a directory locating the data. The image data provided by the digital imaging device and stored in a memory card is ordinarily used to produce some type of display or print, for example, a digital print of optional size made from images scanned from film or taken by an electronic camera.

An electrical connection between the memory card and the imaging device is typically made by means of a card connector which receives the memory card.

U.S. Pat. No. 4,986,618 (Wakatsuki) discloses a memory card storage device in which a memory card is used. The device includes a hinged lid having a slideably mounted card connector to receive the memory card therein. Such a loading configuration for the memory card is complicated and cumbersome. Indeed, as disclosed by Wakatsuki, such a configuration is suited for the field of civil engineering construction wherein the device endures a rugged outdoor application including strong winds and rain. Thus, the Wakatsuki configuration is not preferable for a consumer product wherein consumers request easy and ready access to the memory card.

U.S. Pat. No. 5,337,220 (Granitz) discloses a card connector assembly for use with a memory card. The assembly includes a casing pivotably mounted on a base member. The casing holding the memory card is pivoted so that contact pads on the memory card engage contact members on the base member. A latch member on the memory card maintains the contact between the contact pads and the contact members. While such a device may be suitable for its particular application, the device is not suited for a consumer product since it is complicated and requires a separate exterior door to protect/conceal the assembly. Further, a memory card is required for the latch member to function. Thus, the Granitz configuration is not preferable for a consumer product wherein the configuration should be readily manufacturable, and provide easy access to the memory card by a consumer.

Accordingly, a need continues to exist for a memory card receiving apparatus having a configuration for receiving the memory card and forming an electrical connection therewith. The configuration should be should be readily manufacturable, provide uncomplicated use, provide easy and ready access to the memory card, robust, and suited for consumer products.

SUMMARY OF THE INVENTION

An object of the present invention is to provide a memory card receiving apparatus having a configuration for receiving the memory card and forming an electrical connection therewith.

Another object of the invention is to provide such a memory card receiving apparatus which is readily manufacturable, provides uncomplicated use, provides easy and ready access to the memory card, and suited for consumer products.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an electronic apparatus adapted to receive a memory card. The apparatus comprises a body including an exterior wall having an opening. Disposed on the body adjacent the opening is a latch. Stationarily mounted within the opening is a card connector which has an electrical connection portion. A door connect to the body has a free end and a pivotable end connected to the body. The door moves between (i) an open position to receive the memory card and (ii) a closed position wherein an exterior surface of the door covers the opening. The door further includes a slot formed on an interior surface of the door which is adapted to receive the memory card therein at the free end. An aperture on the door is disposed in overlapping registration with the electrical connection portion when the door is in the closed position. Biasing the door in the open position is a resilient member. A latching feature disposed on the door is adapted to mechanically cooperate with the latch to overcome the biasing of the resilient member when the door is in the closed position.

The present invention provides a memory card receiving apparatus which is readily manufacturable, provides uncomplicated use, provides easy and ready access to the memory card, and is suited for consumer products.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 2 shows a perspective view of a memory card receiving apparatus in accordance with the present invention with a door in the closed position.

FIG. 5 shows a plan view of a portion of an exterior wall of the memory card receiving apparatus.

FIG. 6 shows a perspective view of the door of the memory card receiving apparatus in accordance with the present invention.

FIG. 7 shows a perspective view of the door and a resilient member of the memory card receiving apparatus in accordance with the present invention.

FIG. 10 shows a perspective view of a portion of the memory card receiving apparatus with the door removed and the memory card inserted, to illustrate a keying feature.

FIG. 11 shows a plan view of the portion of the memory card receiving apparatus shown in FIG. 10.

DETAILED DESCRIPTION OF THE INVENTION

Figure 1B:
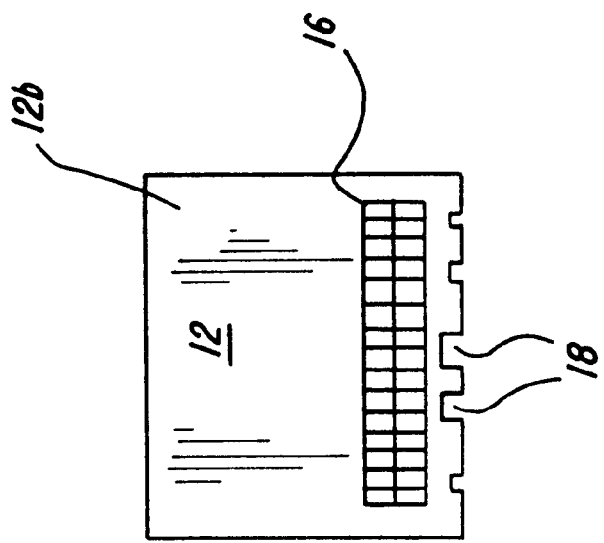
FIGS. 1(a) and 1(b) show a top and bottom surface, respectively, of a memory card suitable for use with a memory card receiving apparatus in accordance with the present invention.

The following is a detailed description of the preferred embodiments of the invention, reference being made to the drawings in which the same reference numerals identify the same elements of structure in each of the several figures.

The present invention relates to a memory card receiving apparatus adapted to receive a memory card. Memory cards are known to those skilled in the art. For example, the memory card can include memory cards adapted to the PCMCIA card interface standard, such as described in the PC Card Standard, Release 2.0, published by the Personal Computer Memory Card International Association, Sunnyvale, Calif., September 1991. The memory card can also be adapted to the Compact Flash interface standard, such as described in the Compact Flash Specification Version 1.3, published by the Compact Flash Association, Palo Alto, Calif., Aug. 5, 1998. Manufacturers of such memory cards include SanDisk, LEXAR, and Intel.

Figure 1A:
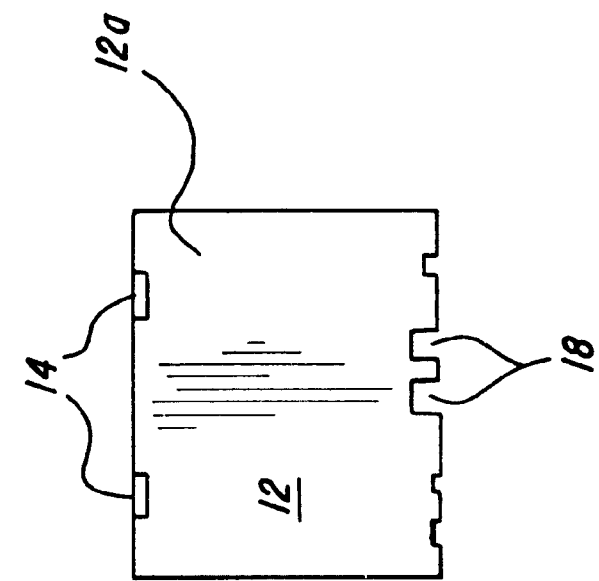

FIGS. 1(a) and 1(b) show an example of a memory card 12 having a top surface 12a and a bottom surface 12b. As further described below, top surface 12a may include one or more notches 14 which may be used to secure memory card 12 within a memory card receiving apparatus. Bottom surface 12b includes a terminal portion 16 through which an electrical connection is made with the memory card receiving apparatus. Memory card 12 may also include one or more keying features 18 by which an electrical identification can be made with the memory card receiving apparatus to ensure electrical compatibility between the memory card and the memory card receiving apparatus.

Figure 3:
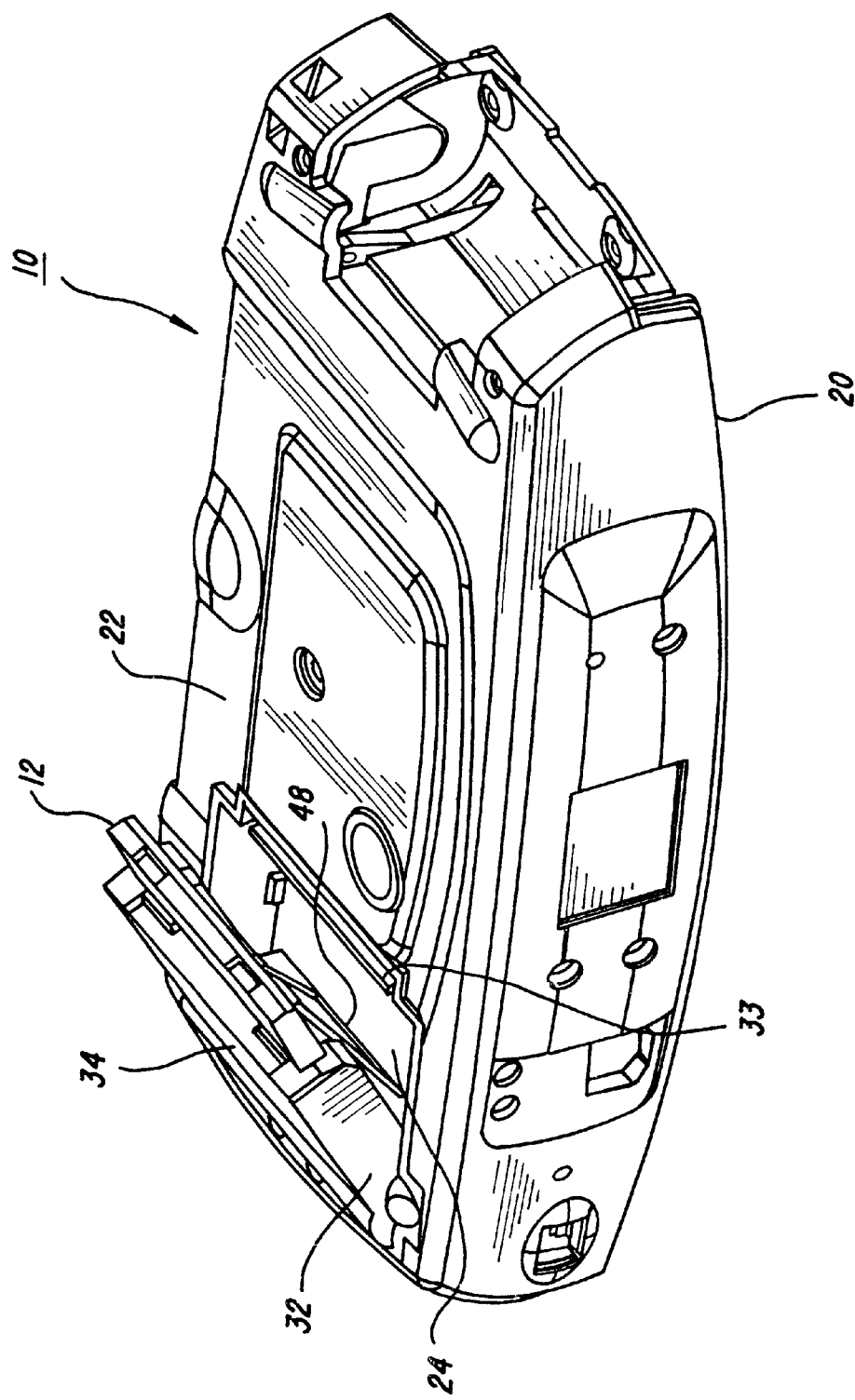
FIG. 3 shows a perspective view of the memory card receiving apparatus of FIG. 2 with the door in the open position and the memory card partially disposed within a slot in the door.
Figure 4:
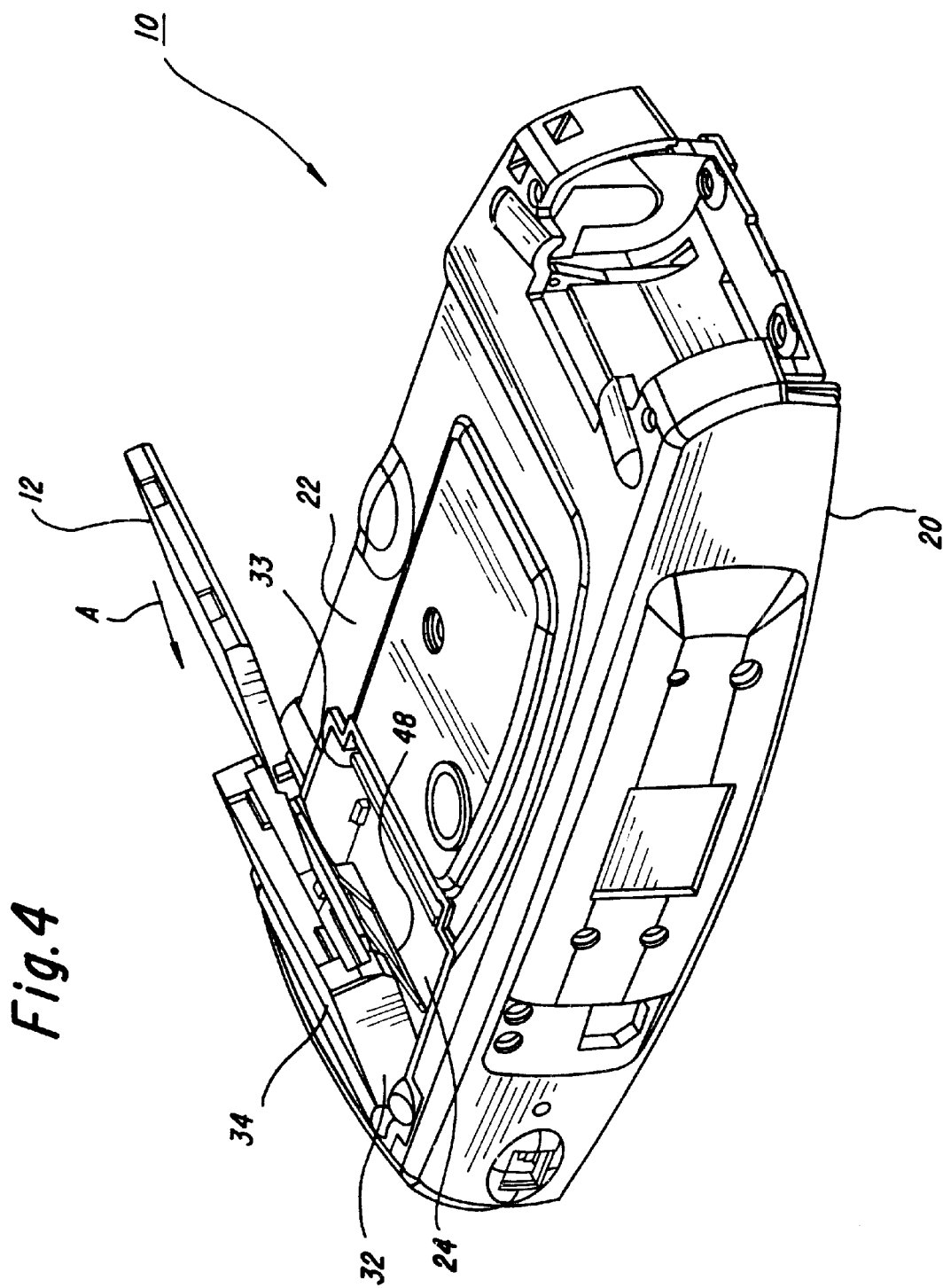
FIG. 4 shows a perspective view of the memory card receiving apparatus of FIG. 2 with the door in the open position and the memory card withdrawn from the slot in the door.
Figure 5:
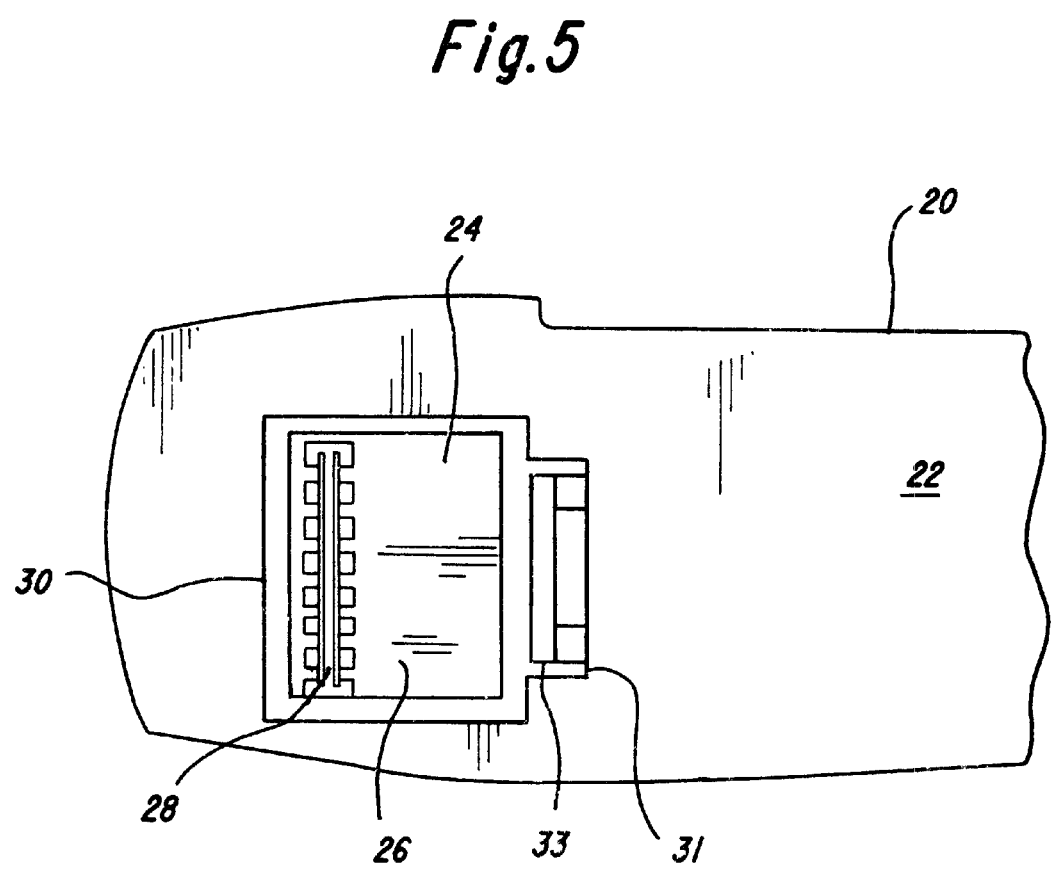

FIGS. 2–4 shows a memory card receiving apparatus in accordance with the present invention. The memory card receiving apparatus is illustrated as an electronic camera 10 adapted to receive memory card 12. A body 20 of electronic camera 10 includes an exterior wall 22 having an opening 24. As best illustrated in FIG. 5, disposed within opening 24 is a stationarily mounted card connector 26 having an electrical connection portion 28 in electrical communication with a circuit board (not shown). Electrical connection portion 28 may be, for example, a conductive rubber strip. An electrical connection is formed between the memory card and the electronic camera through the engagement of terminal portion 16 of memory card 12 with electrical connection portion 28 of card connector 26. Electrical connection portion 28 is disposed toward a first edge 30 of opening 24. On body 20, adjacent a second edge 31 of opening 24 opposite first edge 30, is a latch 33.

Referring to FIGS. 2–5, electronic camera 10 comprises a door 32 having a pivotable end mounted to body 20 adjacent first edge 30 so as to be pivotable between a closed position (as illustrated in FIG. 2) and an open position (as illustrated in FIGS. 3 and 4). In the closed position, an exterior surface 34 of door 32 extends across opening 24 to cover opening 24, with exterior surface 34 preferably being flush with exterior wall 22. When door 32 is in the open position, a free end of door 32, opposite the pivotable end, removably receives memory card 12 in the direction of arrow A, as shown in FIG. 4.

As more particularly illustrated in FIG. 6, door 32 includes a slot 36 formed on an interior surface 38 of door 32. Slot 36 is defined by interior surface 38 and a pair of side walls 40,42 of door 32, and configured to completely receive and house the memory card therein. As such, the slot is integral to the door. Door 32 may optionally include an interior wall 44 to define slot 36. An aperture 46 is provided in slot 36 facing away from interior surface 38 (i.e., within interior wall 44 if the interior wall is provided) adjacent the pivotable end of door 32. Door 32 further includes at least one latching feature 47, illustrated in FIG. 6 as a pair of notches, which is adapted to mechanically cooperate with latch 33 of door 32. Memory card 12 is removably received within slot 36 such that top surface 12a is adjacent interior surface 38 and bottom surface 12b is facing away from interior surface 38. As will become more apparent below, when memory card 12 is disposed within slot 36, terminal portion 16 is in registration with aperture 46.

A resilient member 48 is in mechanical association with door 32 as shown in FIGS. 3, 4, and 7. As illustrated, resilient member 48 is a flat spring in compression having two pivotable locations 50,52 attached to door 32, and a spring loading portion 54. As best shown in FIGS. 3 and 4, resilient member 48 is disposed within opening 24 with spring loading portion 54 abutting a component disposed within opening 24, such as card connector 26. In this orientation, resilient member 48 biases door 32 in the open position.

Figure 8:
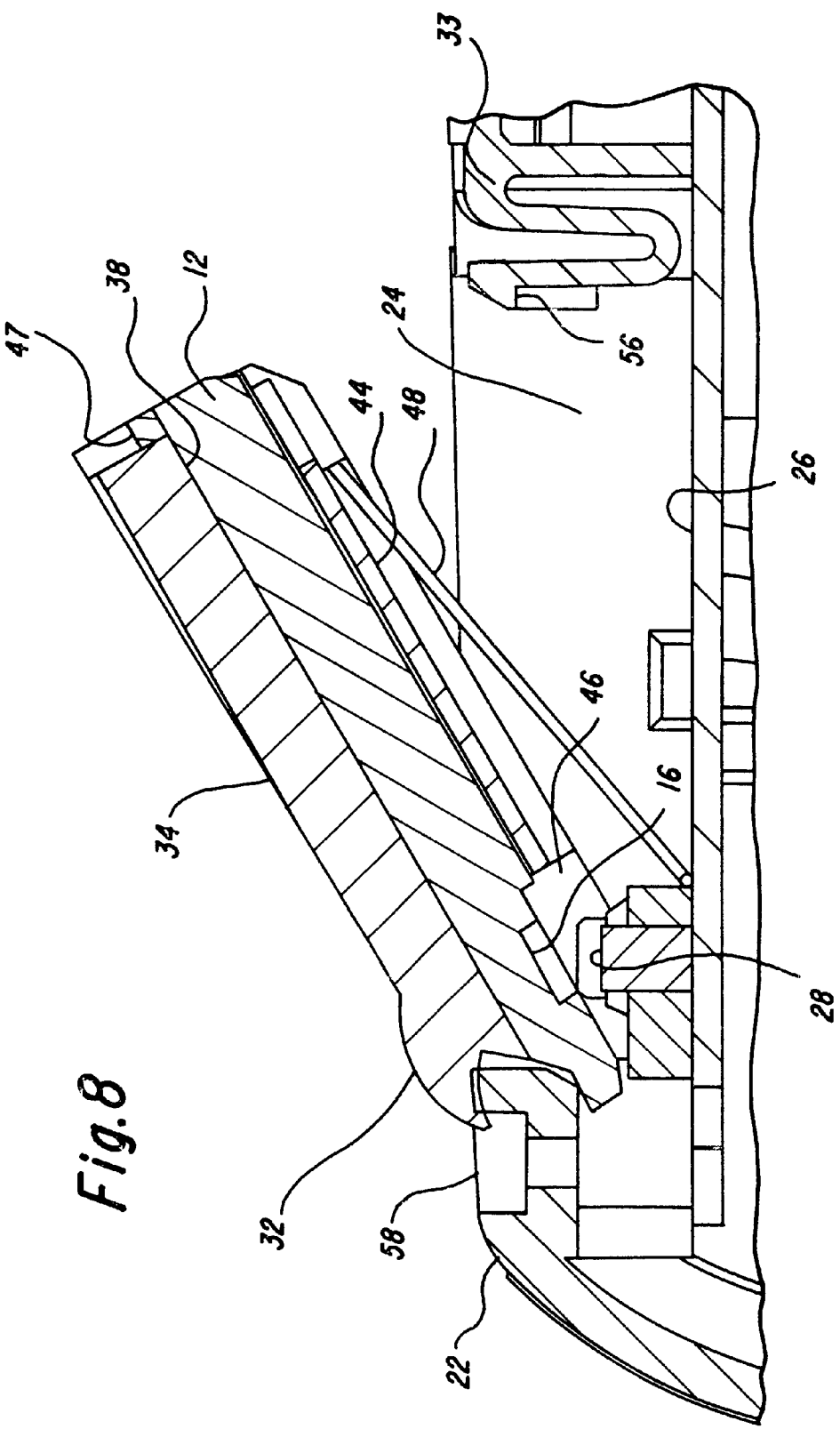
FIG. 8 shows a partial cross-sectional view of the memory card receiving apparatus with the door in the open position.
Figure 9:
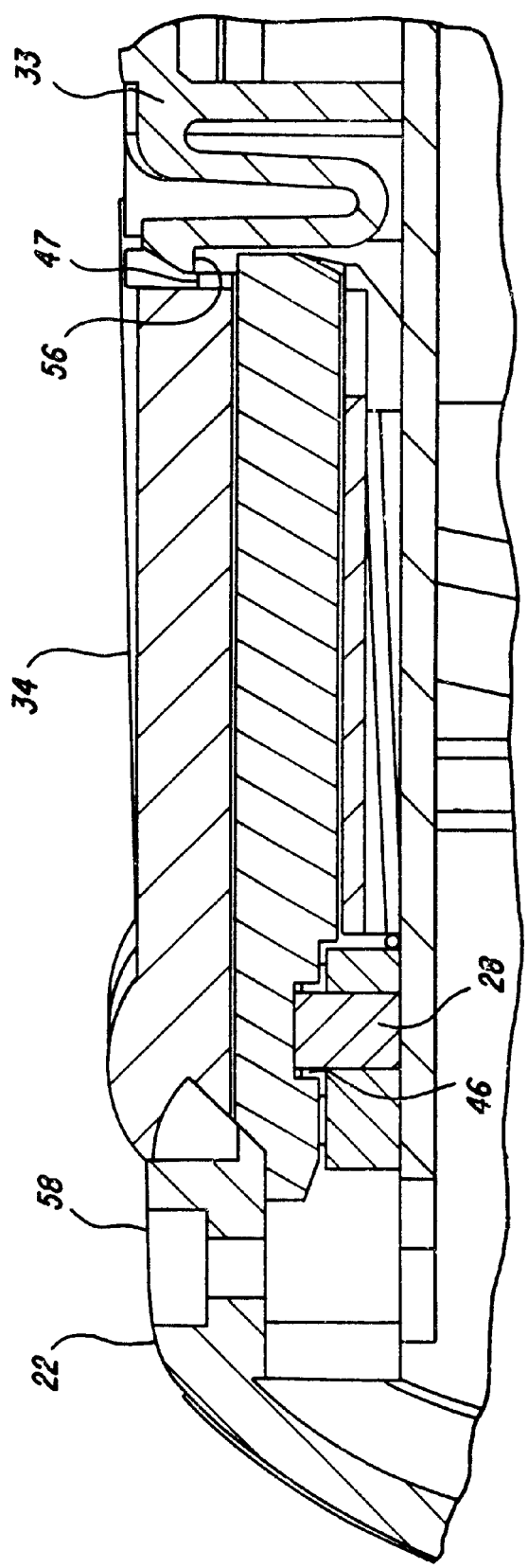
FIG. 9 shows a partial cross-sectional view of the memory card receiving apparatus with the door in the closed position.

The operation of the present invention will now be explained with reference to FIGS. 8 and 9, with FIG. 8 showing the open position and FIG. 9 showing the closed position.

Resilient member 48 biases door 32 in the open position. In the open position, slot 36 is accessible to receive memory card 12 through the free end of door 32. Memory card 12 is inserted into slot 36 such that top surface 12a of memory card 12 is facing interior surface 38 of door 32, and terminal portion 16 of memory card 12 is located near the pivotable end of door 32. FIG. 8 illustrates the memory card inserted into door 32, with door 32 in the open position. Note that interior wall 44 is not in overlapping orientation terminal portion 16.

With memory card 12 inserted, door 32 is pivoted such that exterior surface 34 of door 32 extends across opening 24 to cover opening 24. As illustrated in FIG. 9, in the closed position, exterior surface 34 is flush with exterior wall 22. Latch 33 is shown in FIG. 9 as a stationarily mounted flexible member having an extending portion 56. As such, when the free end of door 32 pivots past extending portion 56 of latch 33, extending portion 56 flexes to mechanically cooperate with latching feature 47 to overcome the biasing of resilient member 48. In this manner, door 32 will remain in the closed position regardless of whether a memory card is disposed within the slot.

In the closed position, the aperture 46 of slot 36 (on interior wall 44) is disposed in overlapping registration with electrical connection portion 28 of card connector 26. Since, terminal portion 16 of memory card 12 is in registration with aperture 46 when the memory card is disposed within the slot, terminal portion 16 engages electrical connection portion 28 to form an electrical connection. As such, an electrical connection is made between card connector 26 and memory card 12 only when door 32 is in the closed position; no electrical connection is made when the door is in the open position, i.e., unlatched.

If additional fastening if desired, an optional fastening may be employed using the notches 14 of memory card 12. That is, extending portion 56 may mechanically cooperate with notches 14 to overcome the biasing of resilient member 48.

As shown in FIGS. 2, 8, and 9, one or more fasteners 58 may be employed on body 20 to compress memory card 12 against electrical connection portion 28. Fasteners 58 prevent door 32 from separating from body 20, thereby providing sufficient force for reliable electrical contact. As illustrated, the fasteners bias exterior wall 22 toward a rigid component internal to body 20. As such, the mechanical association of the latch and latching feature provide the force for the electrical connection.

To ensure electrical compatibility between the memory card and the memory card receiving apparatus, keying features 18 on memory card 12 can be employed. That is, door 32 may include mating keying features (not shown) which are complementary to keying features 18. An alternative, shown in FIGS. 10 and 11, is to include mating keying features 60 on body 20 within opening 24 adjacent first edge 30. Consequently, if a non-compatible memory card is attempted to be inserted into door 32, door 32 will not receive the non-compatible memory card and/or door 32 will not be pivotable to the closed position.

Door 32 is opened by releasing the mechanical cooperation of latch 33 with latching feature 47. This can be accomplished either manually or by some automated means (not shown). Once the mechanical cooperation is released, resilient member 48 biases door 32 in the open position. Memory card 12 is disposed within the slot as shown in FIG. 8, and can be manually removed through the free end of door 32.

The present invention provide several advantages, including a reduced number of components, uncomplicated actuation, and ready access to the memory card.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 electronic camera
12 memory card
14 notches
16 terminal portion
18 keying feature
20 body
22 exterior wall
24 opening
26 card connector
28 electrical connection portion
30 first edge
31 second edge
32 door
33 latch
34 exterior surface
36 slot
38 interior surface
40,42 side walls
44 interior wall
46 aperture
47 latching feature
48 resilient member
50,52 pivotable locations
54 spring loading portion
56 extending portion
58 fasteners

What is claimed is:

1. An electronic apparatus adapted to receive a memory card, comprising:

a body including an exterior wall having an opening;

a latch disposed on the body adjacent the opening;

a card connector stationarily mounted within the opening and having an electrical connection portion;

a door having a free end and a pivotable end connected to the body, the door being movable between (i) an open position to receive the memory card and (ii) a closed position wherein an exterior surface of the door covers the opening, the door including a slot formed on an interior surface of the door and adapted to receive the memory card therein at the free end, the door including an aperture disposed in overlapping registration with the electrical connection portion when the door is in the closed position;

a resilient member biasing the door in the open position; and a latching feature disposed on the door adapted to mechanically cooperate with the latch to overcome the biasing of the resilient member when the door is in the closed position.

2. The electronic apparatus according to claim 1 wherein the memory card includes a terminal portion, and the terminal portion is registered with the aperture when the memory card is disposed within the slot.

3. The electronic apparatus according to claim 1 wherein an electrical connection between the card connector and the memory card occurs only when the door is in the closed position.

4. The electronic apparatus according to claim 1 wherein the latch comprises a flexible member stationarily mounted to the body.

5. The electronic apparatus according to claim 1 wherein the door includes a keying feature.

6. The electronic apparatus according to claim 1 wherein the slot is configured so as to completely receive and house the memory card therein.

7. The electronic apparatus according to claim 1 wherein the latch includes an extending portion which mechanically cooperates with a surface of the memory card to overcome the biasing of the resilient member.

8. The electronic apparatus according to claim 1 wherein the resilient member is a flat spring having two pivot points attached to the door and a spring loading portion abutting a surface within the opening.

* * * * *